T. SEARLS.
Improvement in Ratchet.
No. 128,819.  Patented July 9, 1872.
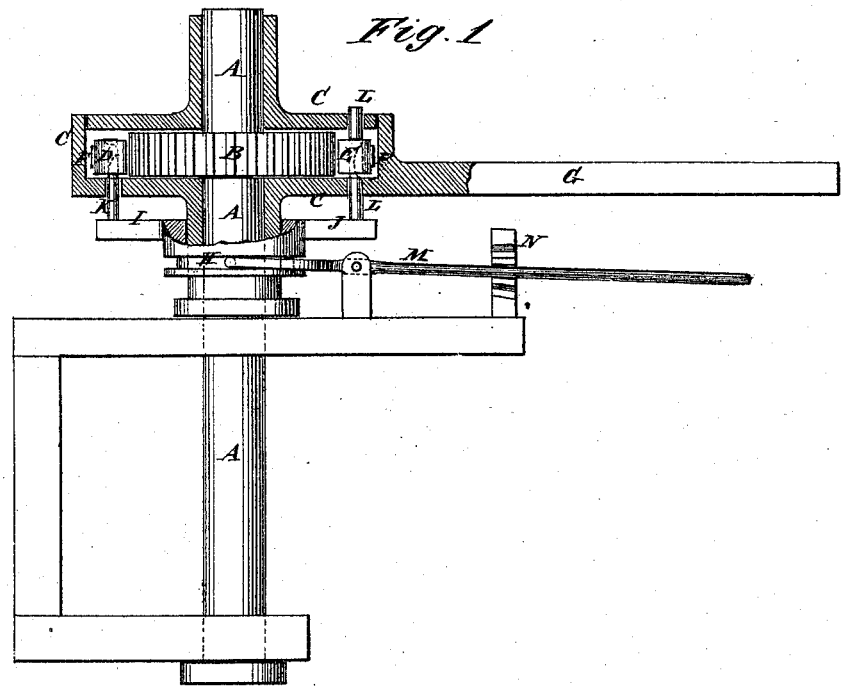
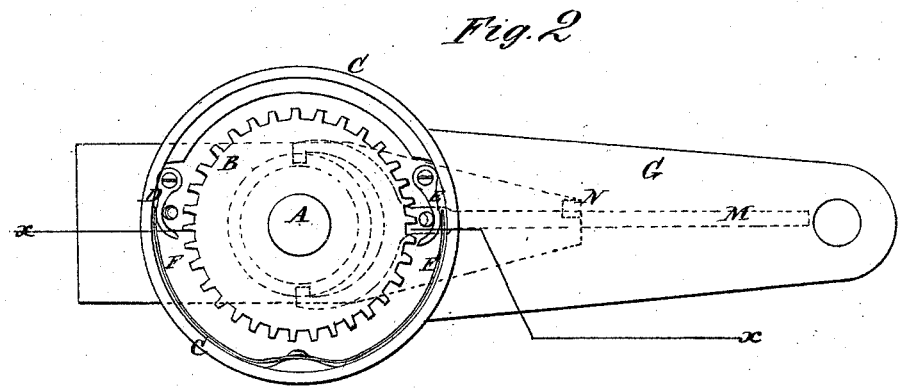
Witnesses:
A. W. Almqvist
W. A. Graham
Inventor:
Thomas Searls.
Per
Attorneys.

UNITED STATES PATENT OFFICE.

THOMAS SEARLS, OF POTTSTOWN, PENNSYLVANIA.

IMPROVEMENT IN RATCHETS.

Specification forming part of Letters Patent No. 128,819, dated July 9, 1872.

Specification describing a new and useful Improvement in Ratchet, invented by THOMAS SEARLS, of Pottstown, in the county of Montgomery and State of Pennsylvania.

In the accompanying drawing, Figure 1 is a side view of my improved ratchet, partly in section, through the line $x\ x$, Fig. 2. Fig. 2 is a front view of the same.

Similar letters of reference indicate corresponding parts.

My invention has for its object to furnish an improved ratchet, which shall be so constructed that it may be readily adjusted to revolve the shaft in either direction, or to let the shaft stand still while the ratchet continues to work; and it consists in the construction and combination of various parts of the ratchet, as hereinafter more fully described.

A is the shaft, to be worked by the ratchet, and to which is attached a toothed wheel, B. C is a case or sleeve, which covers the ratchet-wheel B and rides upon the shaft A. The case C is made in two parts, so that it may be readily opened to obtain access to the operating parts of the ratchet. The interior of the case C is made larger than the wheel B to furnish space for the pawls D E, which are placed upon the opposite sides of the wheel B, and are turned in opposite directions, and are pivoted to the case C. The pawls D E are held forward against the teeth of the wheel B by a spring or springs, F. By this construction, when the case C is moved in one direction one of the pawls, as D, will take hold of the teeth of the wheel B and carry the wheel and shaft B A with it, and when moved in the other direction the other pawl, as E, will take hold of said ratchet-wheel and carry it and the shaft A with it back to the place of beginning. The case C may be operated by an arm or lever, G; or it may have teeth formed upon its circumference, and may be worked by a rack. H is a sleeve sliding upon the hub of the case C, and from the opposite sides of the inner end of which project arms I J, which have stop-pins K L attached to their ends, which pins pass through holes in the case C so as to pass between the pawls D E and the teeth of the wheel B. The pin K is made of such a length that when pushed in between the pawl D and wheel B it may hold the said pawl away from the said wheel. The pin L is made longer than the pin K, and is notched upon the outer side, as shown in dotted lines in Fig. 1. By this construction, when the sleeve H is moved partly forward the pin K is pushed in so as to raise the pawl D away from the wheel B, while the pawl E drops into the notch of the pin L so as to come in contact with the teeth of the wheel B. When the sleeve H is moved fully back the pin K is fully withdrawn, so as to let the pawl D come into contact with the teeth of the wheel B, while the pawl E is held away from said wheel, so that the wheel B will now be revolved in the opposite direction by the same movement of the case C. When the sleeve H is moved half way forward both pawls D E will be held away from the wheel B, so that the case C may be worked without moving the wheel B. The sleeve H is grooved to receive the forked end of the lever M, which is pivoted to the frame-work of the machine, and the outer end of which projects into such a position that it may be conveniently reached and operated to shift the sleeve H. The outer part of the lever M moves along a bar, N, which has three notches formed in it to receive the lever M and hold it securely in either of its three adjustments.

Having thus described my invention, I claim as new and desire to secure by Letters Patent—

The two arms I J and two pins K L, in combination with the sleeve H, case C, pawls D E, spring or springs F, and toothed wheel B, substantially as herein shown and described, and for the purpose set forth.

THOMAS SEARLS.

Witnesses:
MORRIS P. JANNEY,
MIFFLIN WHEELER.